(12) United States Patent
Begley (10) Patent No.: US 10,635,133 B2
(45) Date of Patent: Apr. 28, 2020

(54) METHODS AND SYSTEMS FOR GENERATING ONE OR MORE SERVICE SET IDENTIFIER (SSID) COMMUNICATION SIGNALS

(71) Applicant: 1985736 ONTARIO INC., Stratford (CA)

(72) Inventor: Luke Gordon Begley, Stratford (CA)

( * ) Notice: Subject to any disclaimer, the term of this patent is extended or adjusted under 35 U.S.C. 154(b) by 140 days.

(21) Appl. No.: 15/831,314

(22) Filed: Dec. 4, 2017

(65) Prior Publication Data

US 2019/0171249 A1    Jun. 6, 2019

(51) Int. Cl.
*H04W 84/02* (2009.01)
*G06F 1/16* (2006.01)
*A44C 5/00* (2006.01)
*G06F 3/0488* (2013.01)
*H04W 84/12* (2009.01)

(52) U.S. Cl.
CPC ............ *G06F 1/163* (2013.01); *A44C 5/0015* (2013.01); *G06F 3/0488* (2013.01); *G06F 3/04883* (2013.01); *H04W 84/022* (2013.01); *H04W 84/12* (2013.01)

(58) Field of Classification Search
CPC .... H04W 12/06; H04W 84/022; H04W 84/12
See application file for complete search history.

(56) References Cited

U.S. PATENT DOCUMENTS

| 6,760,710 | B1* | 7/2004 | Perg | G06Q 20/042 |
| | | | | 705/30 |
| 9,137,012 | B2* | 9/2015 | Bailey | H04L 63/0492 |
| 10,477,599 | B2* | 11/2019 | Park | H04W 12/08 |
| 2010/0232337 | A1* | 9/2010 | Das | H04W 4/12 |
| | | | | 370/312 |
| 2015/0134115 | A1* | 5/2015 | Gong | B25J 9/1697 |
| | | | | 700/259 |
| 2016/0088667 | A1* | 3/2016 | Tomita | H04W 4/80 |
| | | | | 370/338 |

* cited by examiner

*Primary Examiner* — Rasheed Gidado
(74) *Attorney, Agent, or Firm* — Eugene J. A. Gierczak; Miller Thomson LLP (57) ABSTRACT

The present invention discloses methods and systems for generating one or more service set identifier (SSID) communication signals. In particular, the present invention discloses an electronic wearable device. The electronic wearable device includes a generator circuit and a transmitter unit. The generator circuit is configured to generate one or more service set identifier (SSID) communication signals. The transmitter unit includes one or more transmitters, the one or more transmitters are configured to transmit the one or more service set identifier (SSID) communication signals to one or more receiving devices simultaneously. The electronic wearable device is configured to support one-way transmission of the one or more service set identifier (SSID) communication signals for control purposes.

24 Claims, 10 Drawing Sheets

Examples

| LETTER | LINE 1 | LINE 2 | LINE 3 | LINE 4 | LINE 5 |
| --- | --- | --- | --- | --- | --- |
| A | NE | SE | E | | |
| B | N | SE | SW | SE | SW |
| C | SW | SE | SW | | |
| D | N | SE | E | E | |
| E | S | E | E | | |
| F | S | E | N | W | |
| G | SW | SE | S | | |
| H | S | E | | | |
| I | N | NE | N | | |
| J | SE | SW | SE | | |
| K | N | E | NE | | |
| L | S | SE | N | SE | |
| M | N | SE | NE | | |
| N | S | SE | N | | |

| LETTER | LINE 1 | LINE 2 | LINE 3 | LINE 4 | LINE 5 |
| --- | --- | --- | --- | --- | --- |
| O | SE | SW | NW | NE | |
| P | N | SE | SW | NE | |
| Q | SE | SW | NW | SE | SE |
| R | N | SE | SW | | |
| S | SW | SE | SW | | |
| T | E | S | | N | |
| U | S | SE | NE | | |
| V | SE | NE | SE | NE | |
| W | SE | NE | | | |
| X | SE | SW | | | |
| Y | SE | NE | N | | |
| Z | E | SW | E | | |

METHODS AND SYSTEMS FOR GENERATING ONE OR MORE SERVICE SET IDENTIFIER (SSID) COMMUNICATION SIGNALS

TECHNICAL FIELD

The present invention generally relates to the field of electronic devices, and in particular, the present invention relates to methods and systems for generating one or more service set identifier (SSID) communication signals.

BACKGROUND

Around 83 percent of experts believe that the Internet of Things (IoT) will make an impact on the everyday lives of users by 2025 and wearable technology will play a very important role. Wearable technology has started enhancing lives of users in various ways and is the future according to a number of studies. Various examples of wearable devices include smart watches, smart glasses, fitness bands or the like. Wearable devices can perform plenitude of tasks as mobile phones but also provide additional sensory and scanning features. The wearable devices further include some form of communication capability and allow the wearer access to information in real-time.

Most wearable devices are designed to allow a user to control multiple devices but one device at one time. For example, a wearable device makes a connection to a first device (such as a mobile phone) to communicate. In order to communicate to a second device (for example, a tablet), the wearable device needs to disconnect from the mobile phone and then connect to the tablet. Moreover, if the wearable device needs to communicate with the mobile phone, the wearable device needs to disconnect from the tablet and reconnect to the mobile phone. The process of connecting and disconnecting is an inefficient way of communicating, specially, when the wearable device needs to connect to a smart home or building of devices or multiple devices which are a part of the Internet of Things (IoT) environment. Most wearable devices use service set identifier (SSID) beacon only for advertisement and miss the true value of this type of communication. Beacons are examples of how humans speak with bursts of information. Beacons can and should be used as a form of communication to control, command, instruct, inform or direct. The use of SSID (Wi-Fi SSID) by various other devices seems inefficient and wasteful due to their complexity. Further, the use of network devices such as, routers create an issue because the routers are two-way devices that usually form a network and the network devices are prone to being hacked by unauthorized users.

The use of smart watches is another solution but, it bears dis-advantages as well. For example, smart watches use a full screen high graphic touch screen display, which is associated with high cost and high of battery power consumption. The associated displayed software applications require extensive memory, processing speed, complexity in design for both user interface (UI) & user experience (UX). Also, updating and syncing are among other challenges associated with smart watches. Additionally, the smart watches use touch screen keyboards and gestures thus, fail to provide a very efficient solution for communication. In view of this, there is an eminent need for efficient methods and systems to overcome the mentioned challenges.

SUMMARY

An embodiment of the present invention discloses an electronic wearable device which includes a generator circuit and a transmitter unit. The generator circuit is configured to generate one or more service set identifier (SSID) communication signals and the transmitter unit includes one or more transmitters which is further, configured to transmit the one or more service set identifier (SSID) communication signals to one or more receiving devices simultaneously, wherein the electronic wearable device is configured to support one-way transmission of the one or more service set identifier (SSID) communication signals for control purposes.

Another embodiment of the present invention discloses a system comprising an electronic device and one or more receiving devices. The electronic device includes a generator circuit and a transmitter unit. The generator circuit is configured to generate one or more service set identifier (SSID) communication signals and the transmitter unit includes one or more transmitters which is further, configured to transmit the one or more service set identifier (SSID) communication signals to one or more receiving devices simultaneously, wherein the electronic wearable device is configured to support one-way transmission of the one or more service set identifier (SSID) communication signals for control purposes. The one or more receiving devices are configured to receive the one or more service set identifier (SSID) communication signals and to use at least one of the SSID communication signals as an input for at least one of: software, application and program.

Further embodiment of the present invention discloses a method for generating one or more service set identifier (SSID) communication signals. The method includes generating one or more service set identifier (SSID) communication signals by an electronic wearable device, the electronic wearable device is configured to support one-way transmission of the one or more service set identifier (SSID) communication signals. Once generated, the one or more service set identifier (SSID) communication signals are transmitted to one or more receiving devices simultaneously. Thereafter, an input is recognised using A-B line segments to create a command output, wherein the command output is included in the one or more service set identifier (SSID) communication signals for use by the one or more receiving devices.

DETAILED DESCRIPTION OF DRAWINGS

The present invention will now be described more fully with reference to the accompanying drawings, in which embodiments of the present invention are shown. However, this invention should not be construed as limited to the embodiments set forth herein. Rather, these embodiments are provided so that this invention will be thorough and complete, and will fully convey the scope of the present invention to those skilled in the art. Like numbers refer to like elements throughout.

Overview

The primary purpose of the present invention is to solve the problem of communicating or establishing connection simultaneously (via service set identifiers) with one or more smart devices without making a connection between the devices. The present invention provides methods and systems for generating one or more service set identifiers (SSID) communication signals by an electronic wearable device. The wearable device is configured to send one-way SSID communication signals via Wi-Fi to various smart devices. The wearable device is configured to receive one-way SSID communication signals where, the wearable device transmits commands via a manual input by the user for the smart devices without connecting. This is similar to how User Datagram Protocol (UDP) works as opposed to connecting devices that use Transmission Control Protocol (TCP). In the present invention, the transmitted and the received signals are a one-way communication and such two one-way signals are equal to a safe alternative to regular two-way communication. The SSID communication signals act as input information for an application, program or software on the smart devices for example, having the ability to control a smart device's music player connected to speakers across the room where, each beacon has a different command (play, pause, next, previous, etc). Based on the input information, the smart device performs the desired tasks or functions. In addition, the wearable device can generate custom SSID communication signals as an input for a software application or program. The wearable device can be used in a wide variety of applications which will be discussed below in detail. As mentioned, the wearable device is only a one-way communication device and is a safe alternative to two-way communication devices (network devices such as routers) that usually form a network. The network devices are prone to being hacked by unauthorized users hence, the wearable device and its configuration is the safe solution as proposed by the present invention.

For easy understanding, the invention is described with a wearable device as an example. However, for a person skilled in the art, it is understood that the present invention is not limited to this example but, can also be implemented for any kind of electronic device as known in the art or developed later.

Exemplary Environment

Figure 1:
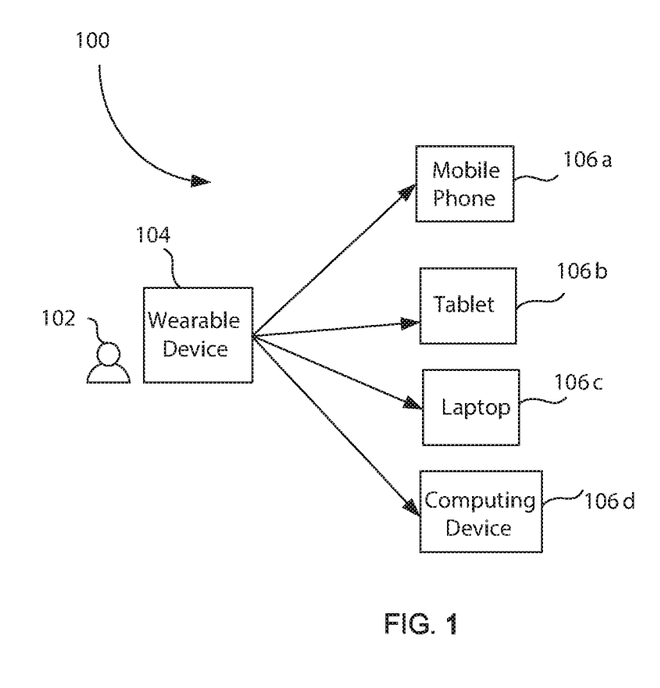
FIG. 1 illustrates an exemplary environment in which various embodiments of the present invention can be practiced.

FIG. 1 is an exemplary environment 100 in which various embodiments of the disclosure can be practiced. The exemplary environment 100 may represent Internet of Things (IoT) environment, a smart environment, for example, personal, business and recreational environment or the like. Various other examples of the environment 100 include, but are not limited to, augmented reality gaming, smart home systems, home appliance, restaurant, resort, theme park, health care, education, first responder, retail store or the like.

As shown, the environment 100 includes a user 102, a wearable device 104, and one or more smart devices 106a (a mobile phone), 106b (a tablet), 106c (a laptop), and 106d (a computing device) (collectively 106). The smart devices 106 can also be referred to as receiving devices. The wearable device 104 is connected to each smart device via a wireless network (not shown), for example Wi-Fi. Various wireless networks may also be implemented such as, Bluetooth or other wireless networks that utilize service set identifiers (SSIDs). In one example, the wearable device 104 is connected to a computing device 106d via Bluetooth for trusted software updates, direction pointing and live control mode.

Generally, the wearable device 104 is used by the user 102 to monitor, control, communicate, interact, navigate and access the SMART world around the device 104. In an embodiment of the present invention, the wearable device 104 may be a part of an environment such that the wearable device 104 communicates with the home owner for various appliances in the home. In another embodiment, the wearable device 104 may operate in an individual device/capacity. The wearable device 104 may be worn on at least one of, but not limited to and, neck or wrist. Examples of the wearable device 104 may include, but not limited to, watches, remotes, glasses, contact lenses, e-textiles, smart fabrics, headbands, beanies and caps, jewelry such as rings, bracelets and hearing aid-like devices. As shown, the receiving devices 106 may be of similar or of different type. For example, all the receiving devices 106 may be smart phones, or may be different from each other as depicted in FIG. 1. The type of receiving devices 106 do not interfere while implementing the present invention.

In context of the present invention, the wearable device 104 is configured to use service set identifiers (SSIDs) for communicating with the receiving devices 106. In particular, the wearable device 104 utilizes Wi-Fi SSID beacon format and uses it for communication instead of access point identification purposes. The SS ID contains up to 32 alphanumeric characters, which are case sensitive and is configured in the wearable device 104. Alternatively, the SSID name may contain the 32-character plain text command input. The wearable device 104 may communicate with the receiving devices 106 for various purposes, for example, the wearable device 104 may control and locate the receiving device 106a.

In an embodiment of the present invention, the wearable device 104 generates one or more SSID communication signals and transmits the SSID communication signals as generated to the receiving devices 106. The wearable device 104 first authenticates itself to one or more receiving devices 106. Here, the wearable device 104 securely authenticates itself to one or more receiving devices 106 through an exchange of one or more pre-set SSID communication signals in software applications and passkey pairs. The wearable device 104 is configured to convert a received SSID signal in one frequency/protocol and transmit the same signal in a different frequency/protocol referred to as signal translating. The receiving devices 106 are configured to pick up the SSID communication signals. The receiving devices 106 are Wi-Fi enabled and are able to perceive Wi-Fi SSID beacons or communication signals and use their variable SSID names as software inputs. The receiving devices 106 use at least one of the SSID communication signals as an input for various software, application or program. The wearable device 104 is configured to send one-way SSID communication signals via Wi-Fi to the receiving devices 106. Further yet, in an embodiment the SS ID communication signals include one or more commands for the receiving devices 106 to perform the desired tasks or functions. The commands are generated based on manual touch input by the user 104 in the form of letters, numerals, symbols, or a combination thereof. For example, a basic dial format is provided, where circling the touch pad in a clockwise direction indicates a downward direction and circling the touch pad in a counter-clockwise direction indicates an upward direction. Further, a click option is provided for selection.

Further yet, in an embodiment of the invention, the SSID communication signals can be used for at least one of, but not limited to, alarming, identifying, controlling, locating, troubleshooting, geo caching, power source identification, service requesting. The SSID communication signals are changeable. For example, via a dual in-line package (DIP) switch (which selects one of several pre-programmed SSIDs). The SSID communication signals may be changeable through a webpage. Further yet, in an embodiment of the present invention, the SSID communication signals may be changeable via USB with connection to a personal computer. Additionally, the SSID communication signals may be changeable over Bluetooth low energy using a mobile application.

The wearable device 104 can be used in various locations such as, but not limited to homes, business offices, data centres, resorts, theme parks, schools, hospitals, malls, retirement homes, theme parks, gaming centres or the like. The wearable device 104 can be used for various audiences such as, but not limited to, vacationers (for customer service, security, location), kids (for lost kid location, for assistance), the elderly (for help assistance, patient care alert), home owners (for DYI troubleshooting, device control, home monitoring, alarming), patients and students (for assistance), data centre operations staff (for alarming, notification), first responders (for locating SOS beacon). The wearable device 104 may be used for indoor or outdoor applications.

Exemplary System

Figure 2:
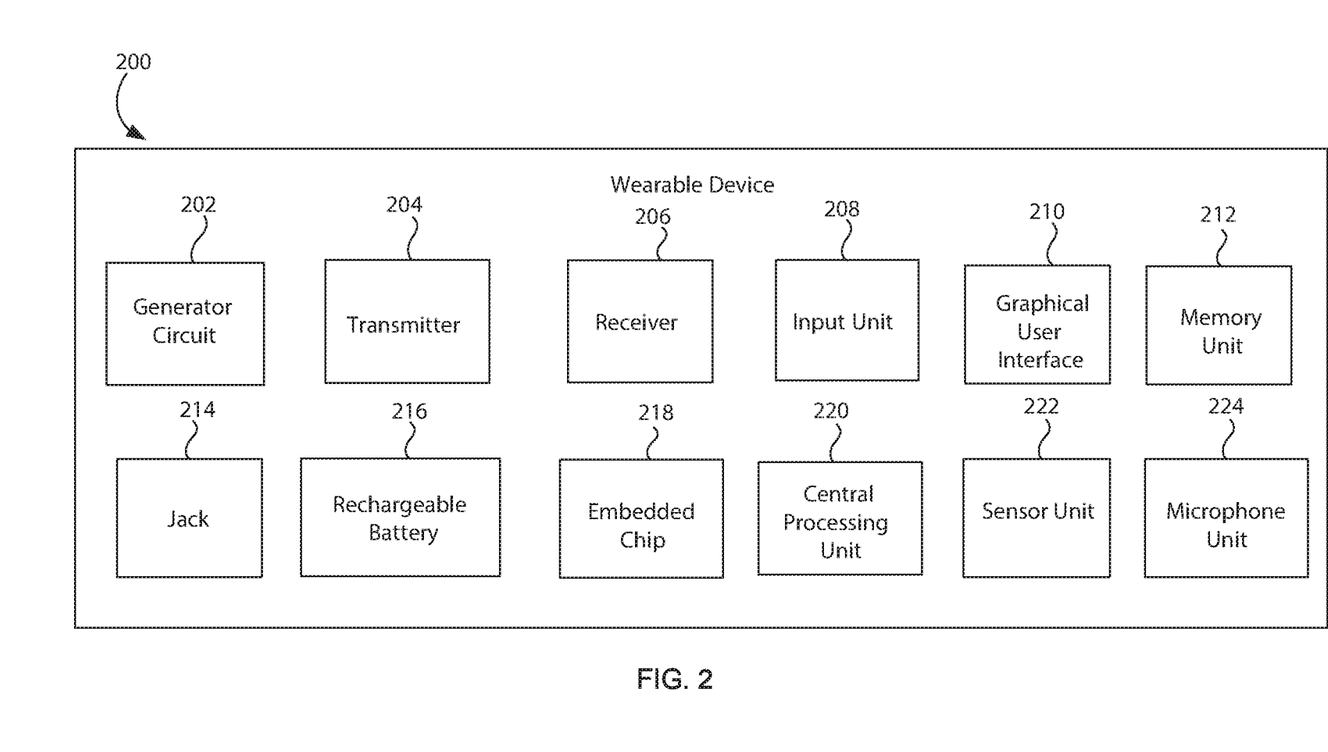
FIG. 2 shows an overall system for generating one or more service set identifier (SSID) communication signals, according to an embodiment of the present invention.

FIG. 2 shows an exemplary system 200 for generating one or more SSID communication signals. The system 200 can be any electronic wearable device and implements wireless technology for communication with one or more receiving devices. With respect to FIG. 2, one or more components will be discussed along with working of the wearable device 200. The wearable device 200 leverages service set identifier (SSID) framework and Wi-Fi technology. Thus, any other details related to SSID or Wi-Fi technology are not necessary for discussing the present invention.

Further yet in an embodiment of the present invention, the system 200 can be used for at least one of, but not limited to, indoor or outdoor user position tracking, service request notification, SOS, alert, assistance request, travel direction location pointing, messaging, device status, smart Wi-Fi device commands. The system 200 can be used as a trackable electronic beacon with pulse ability which can be regulated by a cycle on/off interval setting for indoor/outdoor applications to save power and mitigate radio signal noise and interference of other systems. These are just a few examples but, the present invention may be implemented for other scenarios.

In an embodiment of the invention, the wearable device 200 supports one-way command communication beacons to receiving devices. Although, the wearable device 200 supports two-way status, message, or security verification communication beacons (for informational display purposes only, messages alerts and no actual command actions). The command actions may only be outputted through manual touch input on the device's 200 touchpad face. The wearable device 200 includes a circuitry on an embedded board and is simple in its design that allows it to use less power, small in size and cost less. Further, the wearable device 200 may or may not sync and or need regular updates via wireless connection. This setup is only performed during the addition of a new system through hard wire connection to a trusted source. The wearable device 200 further may not use gestures or keyboards instead use inputs using finger drawn letters, numbers, symbols, dials or clicks.

Further yet, in an embodiment of the invention, the system 200 includes a generator circuit 202, a transmitter unit 204 (also referred to as transmitter), a receiver 206, an input unit 208, a graphical user interface 210 (can be referred to as display screen), a memory unit 212, a jack 214, a rechargeable battery 216, an embedded chip 218, a central processing unit 220, a sensor unit 222, and a microphone unit 224. Although not shown, the system 200 may include a universal serial bus port, a protective case, and a wrist band. Each of the components may coordinate and communicate with each other for implementing the present invention.

Further yet, the central processing unit 220 contains the circuitry necessary to align the information of the input unit 208 with the proper SSID output. The central processing unit 220 further determines manual input and creates the SSID output. The central processing unit 220 may include a graphic processor unit (GPU) to provide visual graphics in the graphical user interface 210. The generator circuit 202 is a Wi-Fi SSID generator circuit or may include an embedded Wi-Fi SSID generator board and may be powered by the rechargeable battery 216, either by AC or DC power source. The generator circuit 202 has a variable signal range and generates one or more SSID communication signals, where the signals of output range can be adjusted. The SSID communication signals are broadcasted to one or more receiving devices, thus, the wearable device 200 is able to communicate with all of the receiving devices without establishing a connection with each of the receiving devices. The SSID communication signals include one or more commands which are received by the receiving devices. The one or more receiving devices use at least one of, SSID communication signals in multiple software applications. Further yet, in an embodiment of the invention, multiple receiving devices can perceive the wearable device 200 and through TAG filtering, the receiving devices can receive commands with a unique user TAG and MAC address confirmation control.

In yet another embodiment of the invention, at least one service set identifier communication signals are customizable by a [TAG] section in the 32-character SSID name for filtering purposes. For example, multiple service set identifier communication signals may be customizable by broadcast range. In further example, multiple service set identifier communication signals may be customizable by channel or by one or more Frequency Bands consisting of 900 MHZ, 2.4 GHZ, or 5 GHZ with the ability to Channel Hop through non-overlapping channels. The service set identifier communication signals may be customized using at least one of a touch pad or a cord connection to a personal device of the user such as, a smart phone/computer.

The transmitter 204 may be a variable range transmitter, which may include a transmitting antenna outputting variable SSID name on variable frequency bands with variable range. Further yet, the transmitter 204 may be a Wi-fi transmitter. The transmitter 204 communicates through one or more Radio Frequency Communications via Wi-Fi SSID signals or beacons following the 802.11 (B/G/N/AC/AH) protocols and associated frequencies (900 mhz, 2.4 ghz, 5 ghz) simultaneously.

The transmitter unit 204 includes one or more transmitters (although not shown), where, each transmitter transmits one or more SSID communication signals to the one or more receiving devices, simultaneously. Further yet, the transmitter 204 is configured to broadcast at least one service set identifier communication signals, by using at least one SSID communication signal, the receiving devices can acquire a range of information to use such as input for the user's software. If the wearable device 200 was powered with AC and plugged into a receptacle, the receiving device may communicate. When power to the board is off and even if the power was "ON" or "Off", transmission of the generated SSID signals is ceased. The signals are useful when troubleshooting an electrical breaker panel as multiple devices may be used at one time to troubleshoot circuits. The signals relay the on/off capability information of the circuits to allow a worker to quickly label a panel. In cases where, a user wishes to use the wearable device 200 as an electronic beacon, the user can connect a battery to the device 200 and a first aid responder can easily pick up the signal and locate with location software. By following the strength of the signal, the first response team could detect and track to person in need of assistance in real-time.

Further yet, in an embodiment of the invention, a single transmitter such as transmitter 204 is shown in FIG. 2. However, it is understood that the present invention is equally applicable for one or more transmitters. In the present invention, each transmitter is capable of sending SSID communication signals, simultaneously. For example, a transmitter "A" may send a SSID communication signal to a receiving device "A" while, simultaneously, a transmitter "B" may send SSID communication signals to receiving devices "C, and "D".

The receiver 206 includes a receiving antenna for receiving signals from multiple devices. The signals indicate any notifications, messages, alerts or security verification requests, but do not include the capability of modifying or controlling the device 200. The SSID information received is further used by the central processing unit 220 to provide the user the graphical user interface 210. The receiver 206 may include a variable range antenna.

Further yet in an embodiment of the current invention, the input unit 208 is configured by a user to customize the one or more SSID communication signals. The input unit 208 may be a touch pad for the wearable device 200 and the user may provide inputs via the input unit 208. For example, the user may draw letters, numbers, symbols, dials, clicks or a combination thereof. The input represents commands for the receiving devices and based on the received commands, the receiving devices perform desired functions. The input unit 208 further, determines or recognizes inputs drawn on the touch pad (circle-shaped sensing touch pad) via user drawing letters, numbers, symbols and dials with their finger and with the assistance of the central processing unit 220 and memory unit 212 identifies the proper command output to be included in the SSID communication signals. The input unit 208 may be a touch pad any one of, but not limited to, a mouse touch pad on a laptop or a touch display. The input unit 208 allows the user to input letters, numbers, symbols or a dial in a clockwise or counter-clockwise direction. The input unit 208 may have a click button beneath the face similar, to the button under the tracking pad on a laptop embedded mouse. Additionally, the input unit 208 may be a finger tracking pad which may use an A-B Line recognition algorithm to differentiate individual manual touchpad inputs. The SSID output signal is variable based on the input of the finger tracking touchpad. The system 200 may further include a peripheral input that is configured to detect at least one of a clockwise touch, a counter-clockwise touch and a slide action by the user referred to as a "dial". Additionally, the peripheral input may be a part of the input unit 208.

The graphical user interface 210 may be a display of any suitable technology, such as a liquid crystal display (LED), an organic light emitting diode display, electronic paper, an electro chromic display, a cathode ray tube display, a pico projector or other suitable components and may be integrated into the wearable device 200. While in other examples, the graphical user interface 210 may represent a separate display screen located on the outside of perimeter of the wearable device 201. The graphical user interface 210 further has the ability to show the user a direction to head towards via arrow and direction name/degree on the circle shaped display screen from real-time location requests performed on phone. The graphical user interface 210 may adjust text font type, font size, font colour, text background highlight colour, or bold & Italic adjustment.

The memory unit 212 is configured to store a unique Media Access Control (MAC) address of the wearable device 200. The memory unit 212 may also store data relevant to the context of the SSID communication signals such as commands, SSIDs, or token and passwords combinations used for security verification of commands as well as, store display graphics, software and firmware.

The jack 214 may be at least one of, universal serial bus styles (standard, mini, mini-b, micro, type-c USB) or an auxiliary jack used for power or communication as well as for hardware updates and set up programming. For example, the updates and programming are performed via direct hardwire connection to a computer or smart device of the user via the jack 214 to a universal serial bus (Out) to a programming device.

The rechargeable battery 216 includes a power source which, can be either DC or AC. The power source may be configured to operate device using stored DC power sourced though the jack 214. The power source and the signal range output may be variable. In some embodiments, the present invention may use solar circuit.

The embedded chip 218 may be NFC, RFID, or HID chip. The chip 218 carries the unique MAC address of the device 200 for the receiving devices to tap for easy setup, or identification for security access.

The sensor unit 222 is configured for recognizing rotation, tilt, acceleration, N,E,S,W direction and so on. The sensor unit 222 further allows monitoring of users directly and efficiently.

The microphone unit 224 is configured for recognizing sound commands. Few such examples include, at least one of, but not limited to, a clap of the hands, a snap of the fingers, a whistle of the mouth and a word spoken by a user.

The universal serial bus input may be used for power and/or communication. The protective case may be used as a case for holding the wearable device 200 to protect from scratching.

The wearable device 200 receives information from the receiving devices. The information may be real-time statuses, messages, notifications or security verification requests through an exchange of pre-set token password combinations or pre-set passkey pairs. This is done to authenticate the wearable device 200 to multiple receiving devices. Further yet, the information displayed on the wearable device 200 via the graphical user interface 210 is further configured to broadcast a "locate me" beacon to locating systems with a customizable pulse rate to save power and mitigate interference signals.

Exemplary Wearable Device and Functions

Figure 3:
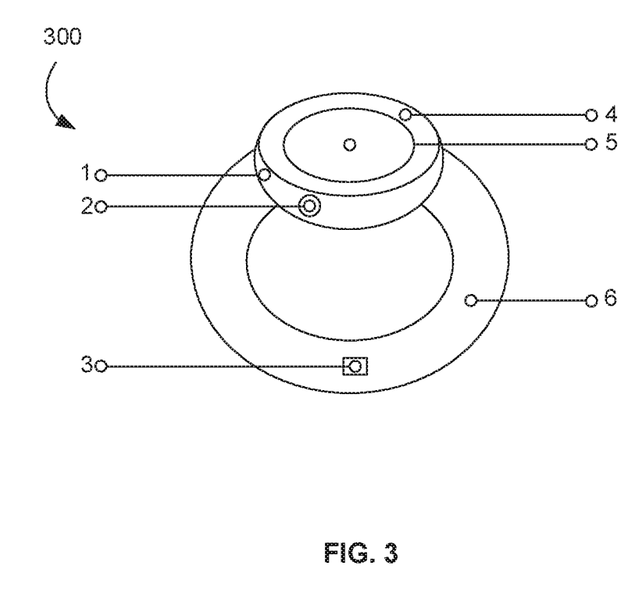
FIG. 3 shows an exemplary electronic wearable device, according to an embodiment of the present invention.

FIG. 3 shows an exemplary structure or design of a wearable device 300. The structure is shown for easy understanding of the present invention but, other embodiments may be implemented. As shown, the wearable device 300 includes SSID generator or receiver (indicated by 1), an auxiliary jack (indicated by numeral 2), an embedded chip (indicated by numeral 3), LED display (indicated by numeral 4), a touch pad (indicated by 5) and a wrist band (indicated by 6).

Figure 4A:
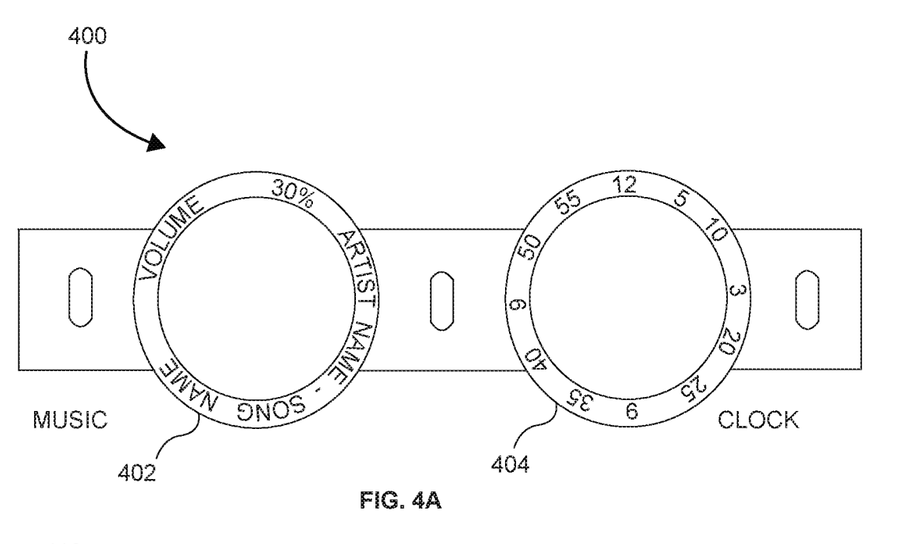
FIGS. 4A, 4B, and 4C show one or more functions of a wearable device, according to an embodiment of the present invention.
Figure 4B:
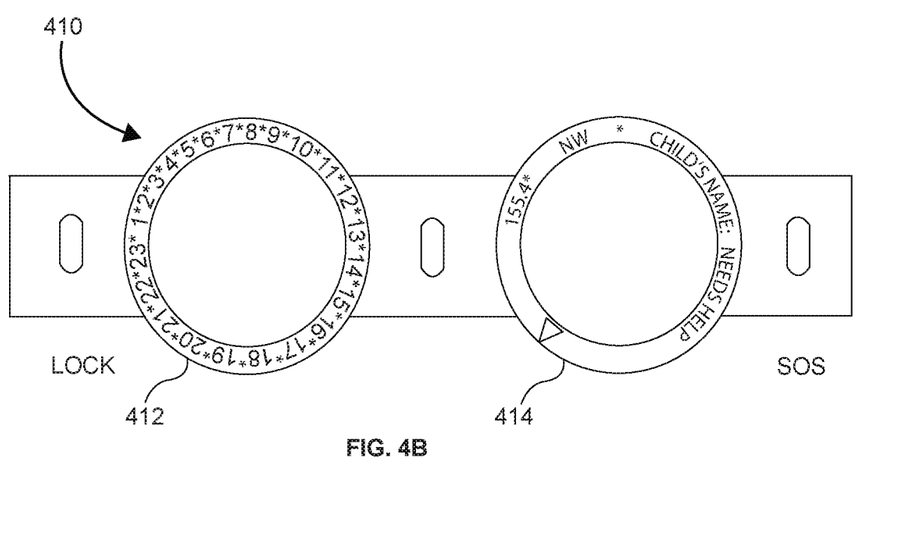
Figure 4C:
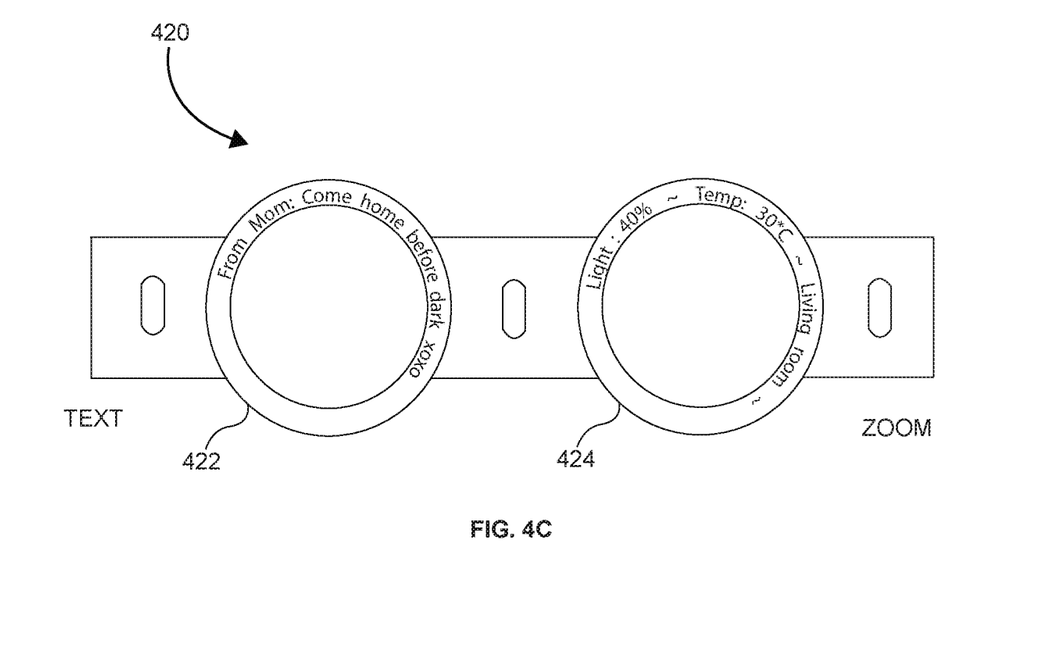

FIGS. 4A, 4B and 4C show various exemplary snapshots indicating functions that can be performed by the wearable device. As shown in the snapshot 400 of FIG. 4A, the wearable device can be used to control music (indicated by 402) or work as a clock (i.e., measures time and display via the screen, indicated by 404). Further yet, in an embodiment of the invention, snapshot 410 of FIG. 4B, the wearable device can be used to unlock the device (indicated by 412) or may provide SOS alerts (indicated by 414). In an additional snapshot 420 of FIG. 4C, the wearable device may be used for texting (indicated by 422) or to provide information to a user such as temperature, lights, for monitoring and control etc (indicated by 424).

Exemplary Inputs

As mentioned previously, the input is provided by the user in the form of at least one of or a combination of, but not limited to, alphabetic characters (can be referred to as alphabets), numerical characters, glyph, dials or clicks. Here, the glyph corresponds to one or more pre-configured service set identifier (SSID) communication signals. At least one of the pre-configured SSID communication signals are used by the one or more receiving devices in software applications for command, communication and/or informational purposes. When the user provides the input in the mentioned format, the wearable device identifies the input and converts into A-B line segments or recognition algorithms. Various examples of such algorithms are shown in FIGS. 5A, 5B, 5C, 5D, 5E and 5F.

Figure 5A:
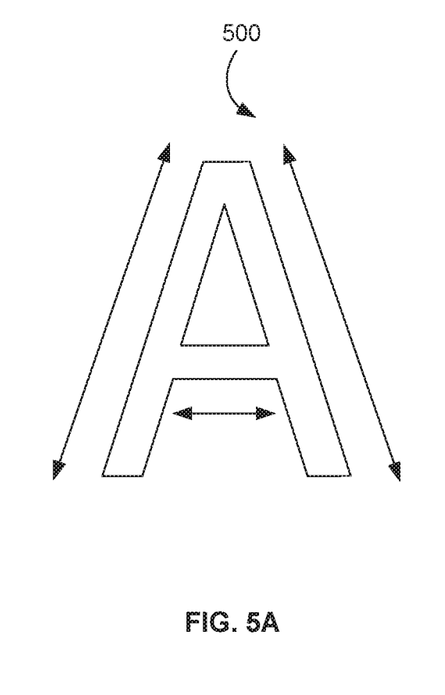
FIGS. 5A, 5B, 5C, 5D, 5E and 5F show one or more exemplary line segments, according to an embodiment of the present invention.
Figure 5B:
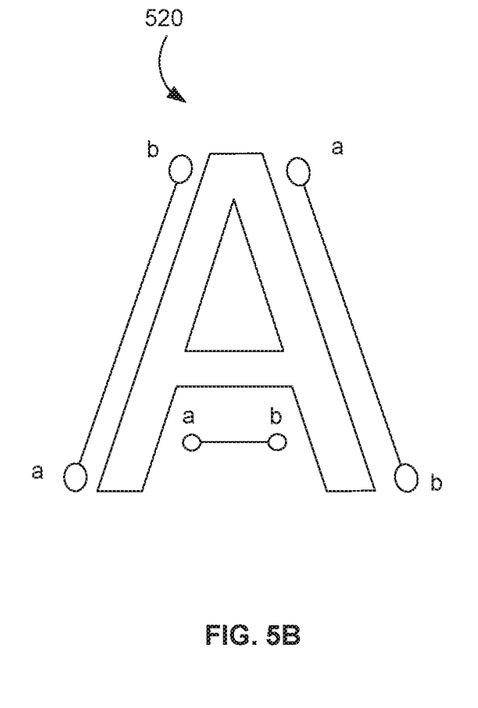

FIGS. 5A and 5B show that all letters, numbers and symbols can be broken into multiple A-B line segments as shown in the snapshots 500 and 520 respectively. The lines can then be defined by their change in direction from point (a) to point (b). Some letters may have more lines than others. For example, the letter "B" has more lines than "A". The lines are then broken down and applied to a four-quadrant grid to identify the letters, numbers and symbols. This is the easiest algorithm.

Figure 5C:
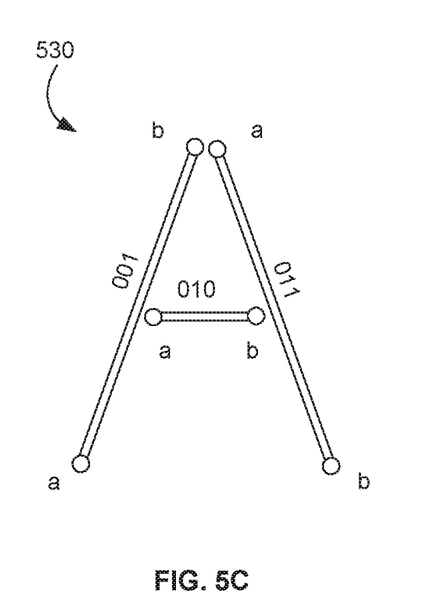

FIG. 5C shows one or more ways (snapshot 530) to break down line path directions. The exemplary directions used are North, East, South and West but, other alternatives may be implemented. For example, the directions may be Up, Right, Down, Left on the face of the wearable device. The four-quadrant sensing grid set-up for the top of the wearable device allows the device to easily use the Y-axis and the X-axis coordinates to figure out the directions of the broken-up lines.

Figure 5D:
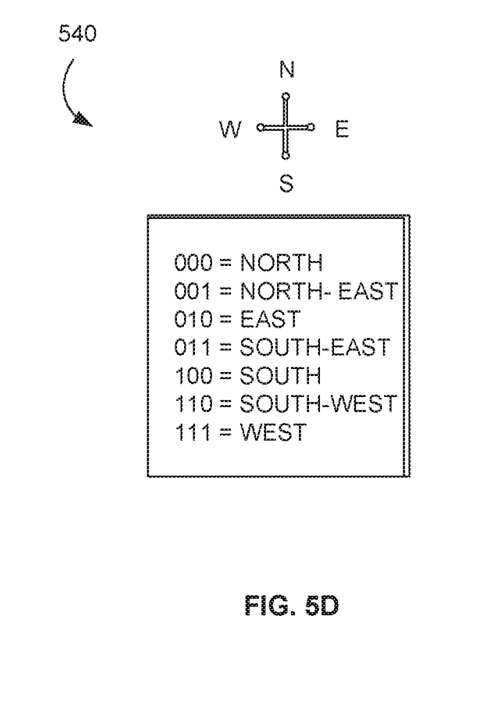

FIG. 5D shows that in a 3-digit binary code and corresponding eight possibilities (snapshot 540). The use of ones and zeros is one of the simplest and easiest ways to communicate by the wearable device with any device, for example, a tablet. The code can be transmitted by the SSID beacon for an input command into any listening devices chosen.

Figure 5E:
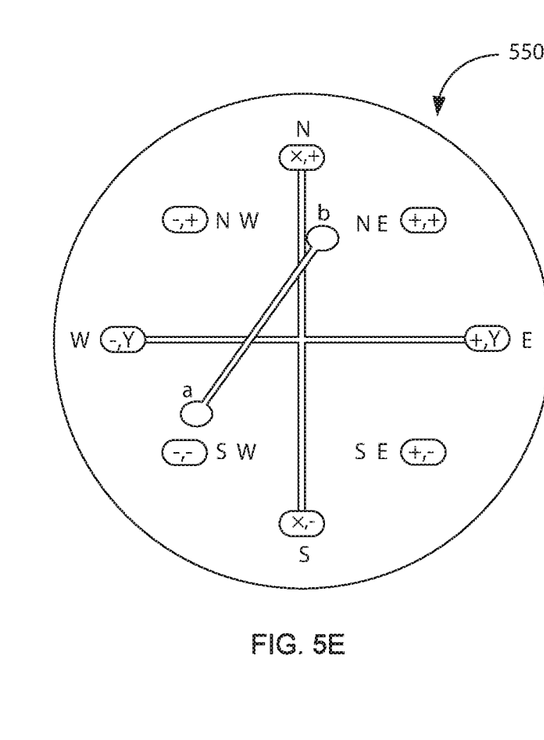

FIG. 5E shows that regardless of where the user's finger lands on the touch pad face, the same algorithm is applied. For example, if the X coordinate stays the same and the Y coordinate makes a positive change, regardless of distance the user moves it is considered a North/Up direction (snapshot 550). Further yet, the instance the coordinates change; signifies a new line has begun with without the lift your finger.

Figure 5F:
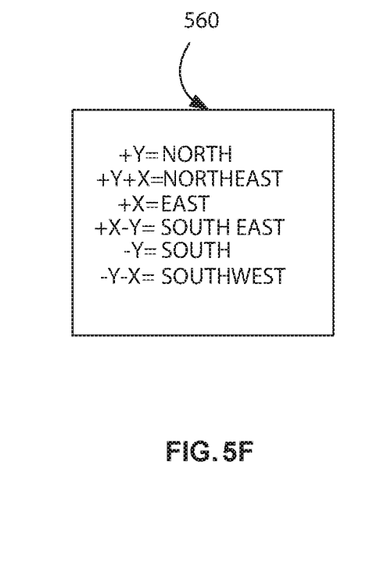

FIG. 5F shows a list (snapshot 560) indicating the other possible direction and the value changes that make them true.

Figure 6:
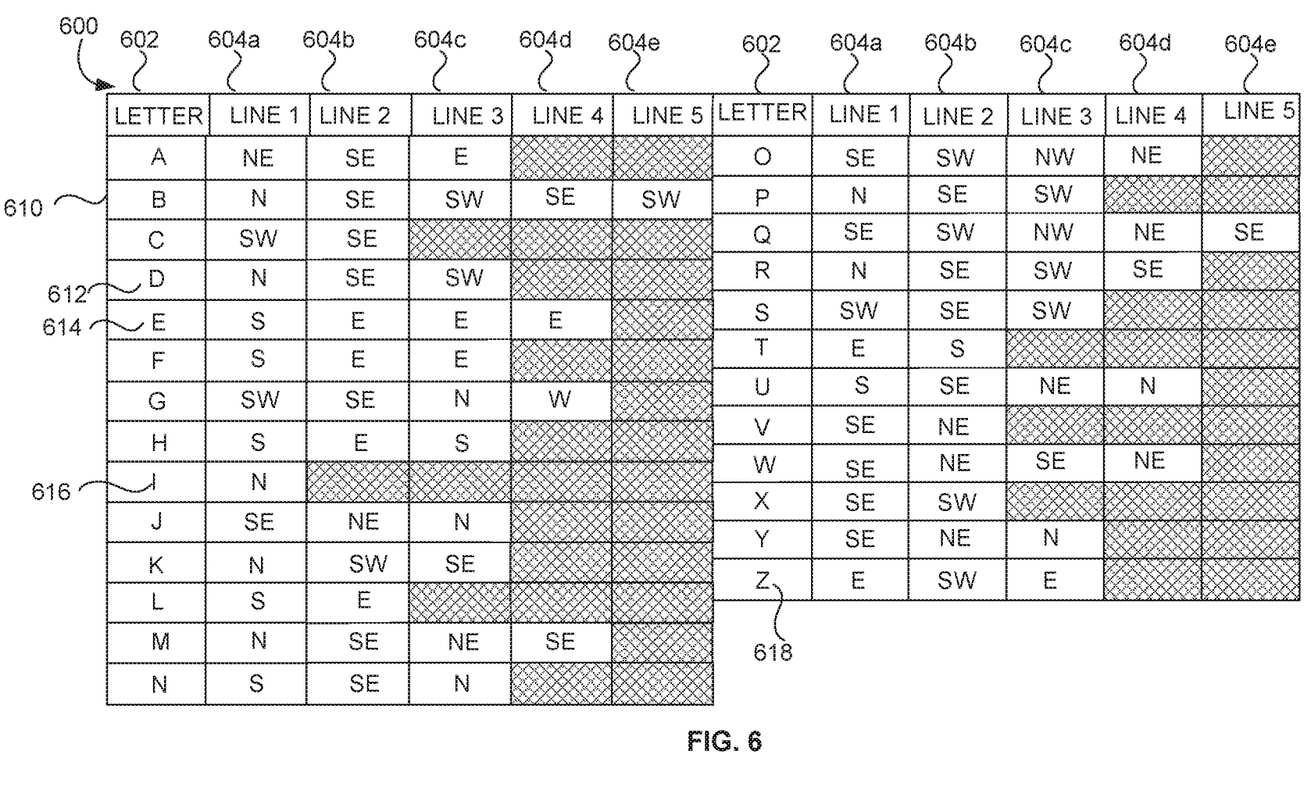
FIG. 6 shows an exemplary table indicating various alphabets and corresponding directions, according to an embodiment of the present invention.

FIG. 6 shows an exemplary table 600 indicating various alphabets and corresponding line segments directions. The table 600 outlines data in the form of columns, where various alphabets are listed under the column "Letter" indicated by 602 and corresponding line segments are represented by various lines indicated as line 1 (marked by 604a), line 2 (marked by 604b), line 3 (marked by 604c), line 4 (marked by 604d) and line 5 (marked by 604e). As shown, the alphabet "B" and corresponding line segments are marked by 610. For example, line 1 is represented by N direction, line 2 by SE, line 3 by SW, line 4 by SE and line 5 by SW. Similarly, other exemplary alphabets and corresponding line segments are shown. The alphabet "D" and corresponding line segments are indicated by 612, alphabet "E" and corresponding line segments are indicated by 614, alphabet "I" and corresponding line segments are indicated by 616 and alphabet "Z" and corresponding line segments are indicated by 618.

Figure 7:
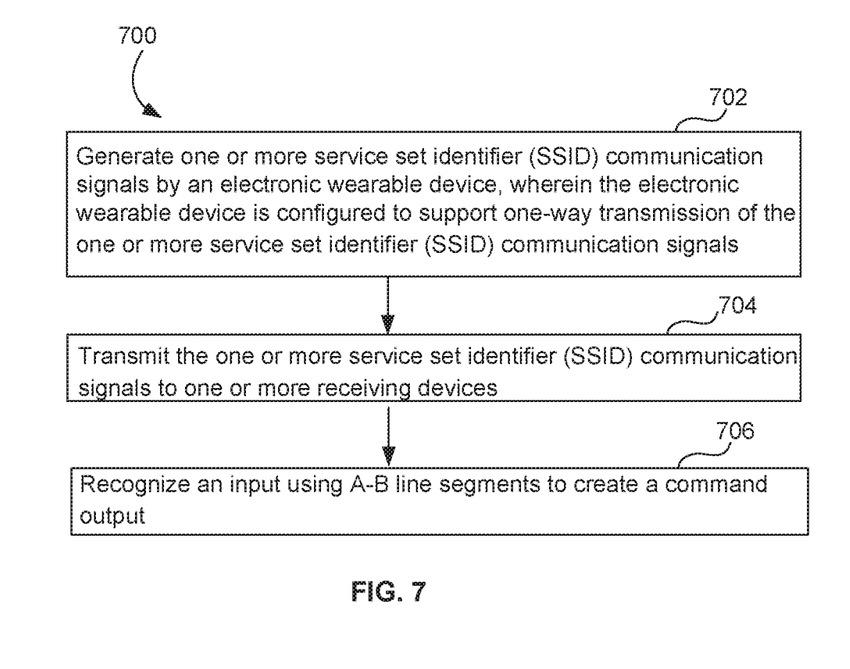
FIG. 7 is a method flowchart for generating one or more service set identifier (SSID) communication signals, according to an embodiment of the present invention.

FIG. 7 is a flowchart 700 for generating one or more service set identifier (SSID) communication signals and communicating the SSID communication signals. The method is implemented with respect to an electronic wearable device.

The methods begin with when a user wishes to control multiple devices at one time, for example, in a smart home. At 702, one or more service set identifier (SSID) communication signals are generated by the wearable device. The wearable device is configured to support one-way transmission of the one or more service set identifier (SSID) communication signals. After generating, at 704, the one or more service set identifier (SSID) communication signals are transmitted simultaneously to at least one, receiving device. The user then provides an input via a touch pad to the wearable device. The input may be in the form of one or more letters, numbers, symbols, dials, clicks or a combination thereof. Based on the received input, the input is recognized by the wearable device to create a command output at 706. The input is recognised using A-B line segments as discussed in detail above. The command output is then included in the one or more SSID communication signals and based on the received SSID communication signals, the one or more receiving devices perform the desired tasks.

The present invention can command devices through SSID communication signals. After the command has been completed, it is necessary for the device to notify the user that this command was accepted, performed and the new operation status of the device. Further yet in another embodiment of the invention, for added secure operations, the device has the ability to request a pass key. Pass keys and tokens are established at first setup and are for one-time use. These combination sets are random in their relation to each other. When a token is sent out by the receiving device, an associated pass key to that token that is stored in the memory unit of the device, is transmitted. This confirms to the command receiving device that the command issuing device is legitimate. This is the security of the device and since every pass key & token combination is different from any previously used and random in its nature therefore, it is impossible to hack.

The present invention may be implemented in the form of a computer programmable product for generating and communicating one or more SSID communication signals to receiving devices. The computer programmable product includes a set of instructions, the set of instructions when executed by a processor causes the processor to perform the methods as discussed with FIG. 7.

The present invention may be implemented for any environment having multiple devices. Various environments are discussed in FIG. 1 but the invention may be implemented for other environments although not mentioned.

The electronic wearable device as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the method of the present invention.

The computer system comprises a computer, an input device, a display unit and the Internet. The computer further comprises a microprocessor. The microprocessor is connected to a communication bus. The computer also includes a memory. The memory may include Random Access Memory (RAM) and Read Only Memory (ROM). The computer system further comprises a storage device. The storage device can be a hard disk drive or a removable storage drive such as a floppy disk drive, optical disk drive, etc. The storage device can also be other similar means for loading computer programs or other instructions into the computer system. The computer system also includes a communication unit. The communication unit communication unit allows the computer to connect to other databases and the Internet through an I/O interface. The communication unit allows the transfer as well as reception of data from other databases. The communication unit may include a modem, an Ethernet card, or any similar device which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include one or more commands that instruct the processing machine to perform specific tasks that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

For a person skilled in the art, it is understood that these are exemplary case scenarios and exemplary snapshots discussed for understanding purposes, however, many variations to these can be implemented in order to detect objects (primarily human bodies) in video/image frames.

In the drawings and specification, there have been disclosed exemplary embodiments of the present invention. Although specific terms are employed, they are used in a generic and descriptive sense only and not for purposes of limitation, the scope of the present invention being defined by the following claims. Those skilled in the art will recognize that the present invention admits of a number of modifications, within the spirit and scope of the inventive concepts, and that it may be applied in numerous applications, only some of which have been described herein. It is intended by the following claims to claim all such modifications and variations which fall within the true scope of the present invention.

What is claimed is:

1. An electronic device comprising:
   an input unit for receiving an external real-time input from a user or physical environment and converting the external real-time input into an electrical signal;
   a processor connected to the input unit to process the electrical signal;
   a generator circuit configured to receive the electrical signal from the processor and generate a customized one or more service set identifier (SSID) communication signals dynamically based on the external real-time input;
   wherein the input unit is configured to be used by the user or the physical environment to customize the one or more SSID communication signals;
   wherein the one or more SSID communication signals are customizable to add additional information to a payload prior to transmission using a [TAG] section in 32 characters of an SSID network name; and
   a transmitter unit comprising one or more transmitters, wherein the one or more transmitters are configured to transmit the customized one or more service set identifier (SSID) communication signals from the generator circuit to one or more receiving devices simultaneously;
   wherein the one or more SSID communication signals may be customizable by broadcast range to support one-way transmission of the customized one or more service set identifier (SSID) communication signals to control, monitor, access, communicate, locate, interact or produce an alarm with the one or more receiving devices simultaneously.

2. The electronic device of claim 1, wherein the transmitter unit is a Wi-Fi transmitter configured to transmit Wi-Fi SSID signals based on the IEEE 802.11 family of protocols and associated frequencies simultaneously.

3. The electronic device of claim 1, wherein the one or more SSID communication signals are customizable based on one or more frequency bands with the selected ability to channel hop through non-overlapping channels according to one of the IEEE 802.11 family of protocols.

4. The electronic device of claim 3, wherein the input unit is touch sensitive and configured to detect one or more A-B line patterns drawn/written by the user.

5. The electronic device of claim 4, wherein each line pattern of the one or more line patterns is at least one of a group comprising an alphabetical character, numerical character and a graphical character symbol all referred to as "Glyphs".

6. The electronic device of claim 5, further comprising a peripheral input configured to detect at least one of a clockwise, or counter-clockwise touch combined with a slide action by the user referred to as a "dial" allowing the SSID to be modified in real-time for variable control ability.

7. The electronic device of claim 6, wherein the glyph drawn customizes the SSID communication signal, and wherein the one or more receiving devices use the SSID communication signals in software applications for command, communication and/or informational purposes.

8. The electronic device of claim 1 further comprising a graphical user interface configured to provide informational messages to a user by converting received SSID beacons from other devices according to one of the IEEE 802.11 family of protocols.

9. The electronic device of claim 1 further comprising a memory unit configured to store a unique Media Access Control (MAC) address, indoor or global positioning systems (IPS or GPS) location coordinates of the electronic device.

10. The electronic device of claim 1 further configured to be connected to a computing device.

11. The electronic device of claim 10, wherein the electronic device is connected to the computing device through Bluetooth, WIFI, or a dedicated physical cable connection for trusted software updates, direction pointing and live control mode.

12. The electronic device of claim 1 further configured to convert a received SSID beacon frame signal in one frequency/protocol and transmit the same signal payload in a different frequency/protocol according to one of the IEEE 802.11 family of protocols referred to as "signal translating".

13. The electronic device of claim 1 further configured to securely authenticate itself to the one or more receiving devices through an exchange of pre-set SSID passkey pairs.

14. The electronic device of claim 1 further comprising a microphone unit configured to convert sound commands comprising at least one of a group of a clap of the hands, a snap of the fingers, a whistle of the mouth and a verbal command spoken by a user to create a command output wherein the command output is included in the one or more service set identifier (SSID) communication signals is for use by the one or more receiving devices as a software input.

15. The electronic device of claim 1 is further configured to broadcast a "locate me" SSID beacon to indoor or outdoor positioning systems with a customizable pulse rate to save power, modulate signal and mitigate signal interference.

16. The electronic device of claim 1, wherein the electronic device is used in at least one environment selected from a group comprising residential, commercial, industrial or agricultural land properties.

17. The electronic device of claim 1, wherein the electronic device is at least one of a group comprising a wrist band, a watch, a head gear, a piece of clothing, a waist band, a ring, a pair of glasses, a remote, a handheld, a piece of jewellery, a hearing aid-like devices and an ankle band.

18. The electronic device of claim 1 wherein the external real-time input from said physical environment includes; a sensor unit configured to recognize rotation, tilt, acceleration, N.E.W.S. direction, temperature, pressure; and a unit configured to recognize sound commands.

19. A system comprising:
one or more service set identifier (SSID) communication signals;
an electronic device having:
an input unit for receiving an external real-time input from a user or physical environment and converting the external real time input into an electrical signal;
a processor connected to the input unit to process the electrical signal;
the generator circuit configured to receive the electrical signal from the processor to generate customized the one or more service set identifier (SSID) communication signals dynamically based on the external real-time input;
wherein the input unit is configured to be used by the user or the physical environment to customize the one or more SSID communication signals;
wherein the one or more SSID communication signals are customizable to add additional information to a payload prior to transmission using a [TAG] section in 32 characters of an SSID network name;
a transmitter unit comprising one or more transmitters, wherein the one or more transmitters are configured to transmit the customized one or more service set identifier (SSID) communication signals to one or more receiving devices simultaneously;
wherein the one or more SSID communication signals may be customizable by broadcast range to support one-way transmission of the customized one or more service set identifier (SSID) communication signals to control, monitor, access, communicate, locate, interact or produce an alarm with the one or more receiving devices simultaneously; and
wherein the one or more receiving devices are configured to receive the one or more service set identifier (SSID) communication signals and to use at least one of the SSID communication signals as an input for a software application program.

20. The system of claim 19, wherein the one or more SSID communication signals are customizable by broadcast range, to save power, modulate signal and mitigate signal interference.

21. The system of claim 19, wherein the one or more SSID communication signals are customizable based on one or more frequency bands with selected ability to channel hop through non-overlapping channels according to one of the IEEE 802.11 family of protocols.

22. A method for generating one or more service set identifier (SSID) communication signals, comprising:
receiving an external real-time input comprising A-B line segments of a user's drawn "glyphs" and "dials" on a touch sensitive input unit;
converting the external real-time input on the touch sensitive input unit into an electrical signal;
generating one or more customized service set identifier (SSID) communication signals by an electronic device dynamically based on the electrical signal wherein the electronic device is configured to support one-way transmission of the customized one or more service set identifier (SSID) communication signals;
wherein the input unit is configured to be used by the user to customize the one or more SSID communication signals; and
wherein the one or more SSID communication signals are customizable to add additional information to a payload prior to transmission using a [TAG] section in 32 characters of the SSID network name; and
transmitting the customized one or more service set identifier (SSID) communication signals to one or more receiving devices simultaneously; and
wherein the one or more SSID communication signals may be customizable by broadcast range;
create a command output wherein the command output is included in the one or more service set identifier (SSID) communication signals for use by the one or more receiving devices as a software input.

23. The method of claim 22 further composing receiving the same "glyph" and "dial" input from a user to utilize as command inputs for software applications locally on the electronic device.

24. The method of claim 22 wherein the one or more customized service set identifier (SSID) communication signals is selectively used to:
a) control light, temperature, building smart system, b) unlock and lock
c) music
d) text
e) clock
f) alarm with the one or more receiving devices.

* * * * *